United States Patent [19]

Kajimoto

[11] Patent Number: 5,189,730
[45] Date of Patent: Feb. 23, 1993

[54] APPARATUS FOR GENERATING CHARACTER PATTERN SIGNALS AND METHOD FOR GENERATING SAME

[75] Inventor: Kazuhiro Kajimoto, Suwa, Japan

[73] Assignee: Seiko Epson Corporation, Tokyo, Japan

[21] Appl. No.: 488,575

[22] Filed: Mar. 1, 1990

[30] Foreign Application Priority Data

Mar. 2, 1989 [JP] Japan .................................. 1-51298

[51] Int. Cl.$^5$ ............................................. G06F 15/62
[52] U.S. Cl. ..................................... 395/142; 395/151
[58] Field of Search ........................ 364/518, 521, 523;
340/735, 790; 395/142, 150, 151

[56] References Cited

U.S. PATENT DOCUMENTS 4,674,058  6/1987  Lindbloom et al. ................. 364/518
4,686,633  8/1987  Schrieber ............................. 364/523

Primary Examiner—Gary V. Harkcom
Assistant Examiner—Mark K. Zimmerman
Attorney, Agent, or Firm—Blum Kaplan

[57] ABSTRACT

An apparatus for generating character pattern signals in response to a character code and an attribute signal, in which the character has an outline which may be divided into a plurality of regions in which each region is defined by an initial point, a terminal point and a control point includes an outline storage circuit for converting the control point into an auxiliary point having coordinates on a curve of the character and for storing the initial point, terminal point and auxiliary point as data. An outline reproducing circuit converts the data into scaled down data, standard sized data or enlarged data in response to the attribute signal and produces a conic line based upon the converted data. A selecting circuit, in response to an attribute signal indicating that the scaled down data is to be output computes a linear function producing a first line segment for connecting the initial point to the auxiliary point, a second line segment for connecting the terminal point to the auxiliary point, a third line segment for connecting the terminal point to the initial point as well as computing a maximum gap between the reduced sized outline and the line segments and outputting the output of the outline reproducing circuit when the maximum gap is greater than a reference value and the linear function as the outline when the maximum gap is smaller than a reference value. The output of the outline reproducing circuit is selected at all other times.

4 Claims, 5 Drawing Sheets

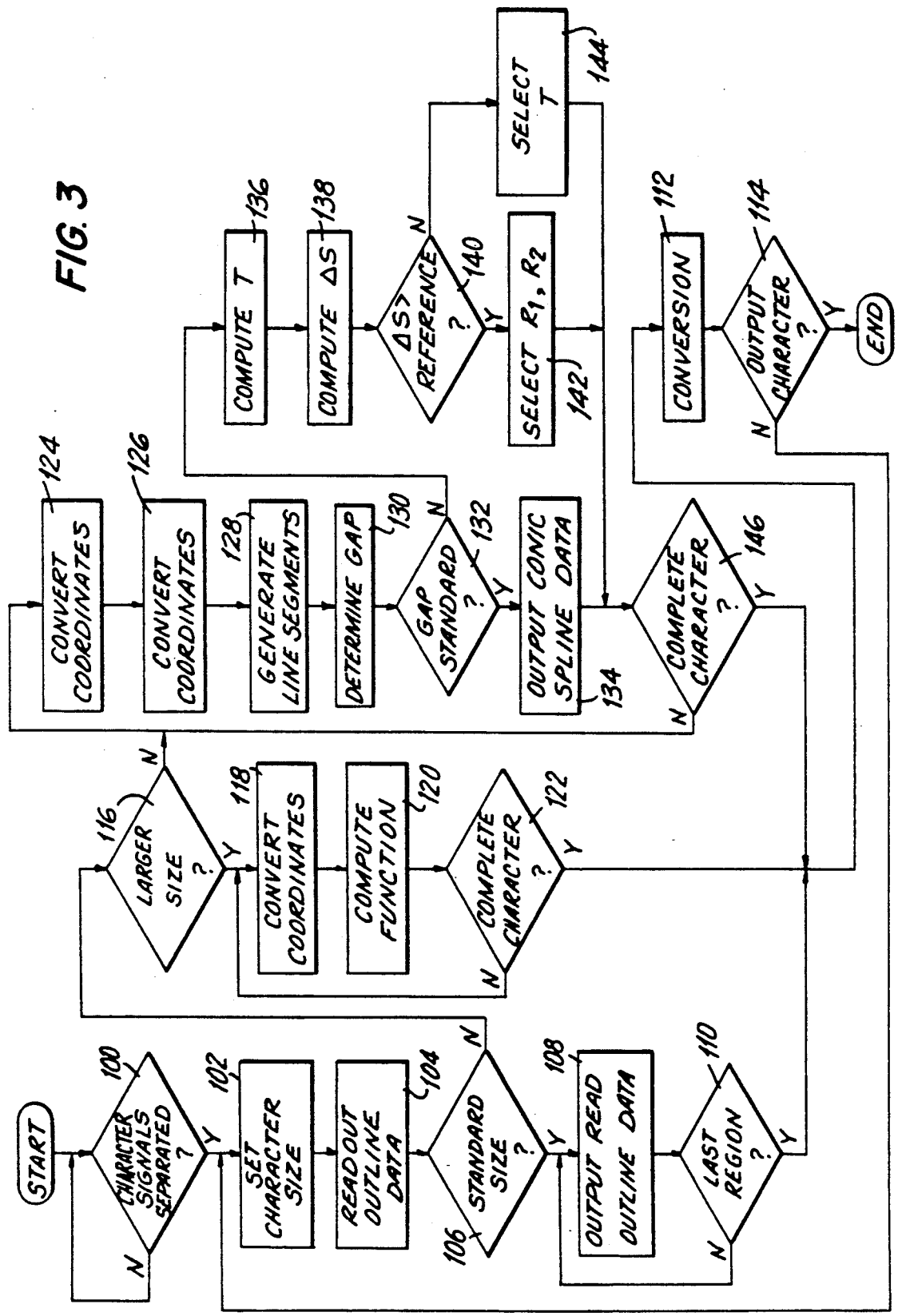

APPARATUS FOR GENERATING CHARACTER PATTERN SIGNALS AND METHOD FOR GENERATING SAME

BACKGROUND OF THE INVENTION

The present invention is directed to an apparatus and method for generating a character pattern signal, and in particular, to an apparatus and method which generates the character pattern signal utilizing a dot pattern formed from outline font data which are stored as bits of outline information.

In present word processors and the like, in order to enhance print quality of a character pattern, the number of dots which form the character pattern need to be increased. However, this requires a corresponding increase in storage capacity of the character generator because of the need for storing additional dot pattern data for each character. The conventional manner for obviating this problem has been through the introduction of an outline system. As shown in FIG. 6 of the drawings, in the outline system, the outline of a character pattern is divided into a plurality of regions extending about the perimeter of a character such as regions $J_0, J_1, J_2$. The coordinates of an initial starting point and a terminal point for each region $J_0, J_1, J_2$ are stored as data and the section of the outline between these points is compensated by dot signals during the outputting of the signal. With this system, it becomes possible to output high quality characters utilizing a large number of dots while reducing the amount of data which is required to be stored as well as providing the capability of enlarging and shrinking the size of the character by effecting coordinate arithmetic operations allowing the character to be produced in a variety of character sizes.

As seen in FIG. 7A, an approximation of a curve perimeter $J_n$ forming a character outline typically includes two straight lines K as shown in FIG. 7B joining a circular arc L at respective points Q. Therefore, when precisely approximating a curve or linear portion of an outline section $J_n$, it is necessary to store a large number of representative circular arcs having different radii thus increasing the storage capacity required in the conventional system.

To eliminate the need for increased storage capacity a method illustrated in FIG. 7C has been utilized in which the curve is identified by the data equivalent of a conic spline which defines a curve having three points, the initial point A and a terminal point B both of which are on the actual curve to be defined and a control point C which is formed at an intersection of a tangent line extending from the curve at initial point A and terminal point B. [The conic spline functions to provide an approximation of a character outline by the use of a smooth curve while requiring a small storage capacity. However, the use of the mathematical conic spline does require complicated arithmetic operations requiring a sufficiently increased real time until the dot signals are output.

It is desired to present an apparatus and method for generating character pattern signals which overcome the shortcomings of the prior art by defining a character without the need for a large storage capacity or complicated arithmetic operations.

SUMMARY OF THE INVENTION

A character perimeter is divided into a plurality of regions. Each region of the perimeter of a character is defined in terms of conic line data which defines a curve as having an initial point and a terminal point of the region and a control point which is position outward of the curve. Generally speaking in accordance with the invention, an apparatus for generating character pattern signals includes an outline data storage means for converting the control point into an auxiliary point having coordinates at a single point on the curve being defined and for storing the initial, terminal and auxiliary points as data. A coordinate arithmetic circuit reads out the data and changes the coordinates dependent on the size of the character to be printed relative to a standard size. An outline data reproducing circuit reproduces a conic line from the converted data read out from the coordinate arithmetic circuit. A selecting circuit computes both a linear function for connecting the initial point, terminal point and auxiliary point of the outline data to each other as well as a maximum gap between the curve passing through these points and the linear function if the character is to be printed at a smaller than standard size and outputs the conic line data when the maximum gap is greater than a reference value and the linear function as outline data when the maximum gap is smaller than the reference value. The selecting circuit outputs the outline data if the character is a standard size and enlarged outline data if the character is to be enlarged. A dot pattern data converting circuit outputs dot signals in response to the outline data.

A character pattern signal for an outline of a character is generated by first converting a control point of the arithmetic conic spline into an auxiliary point on the conic spline. A conic spline is reproduced by employing the auxiliary point in a standard sized character reproduction mode or in an enlargement reproduction mode. If the character is to be produced in a decreased mode relative to a standard sized character, a linear function is computed for connecting the auxiliary point to an initial point and a terminal point. A maximum gap between the curve passing through these points and the linear functions is computed and an outline of the character determined by the conic spline is reproduced if the maximum gap is greater than a reference value and a linear function is produced as outline data when the maximum gap is smaller than the reference value.

Accordingly, it is an object of the invention to provide an improved apparatus for generating character pattern signals.

Another object of the present invention is to provide an apparatus for generating character pattern signal which speeds up the printing process while maintaining print quality.

Yet another object of the present invention is to provide an apparatus for generating a character pattern signal which omits excessive arithmetic processes by selecting arithmetic accuracies in accordance with dot sizes without increasing storage capacity.

A further object of the present invention is to provide a method for generating a character pattern signal which is capable of increasing printing speed while maintaining printing quality by removing the need of excessive arithmetic processes without increasing the storage capacity required for the printer.

Still other objects and advantages of the invention will in part be obvious and will in part be apparent from the specification.

The invention accordingly comprises the several steps and the relation of one or more of such steps with respect to each of the others, and an apparatus embodying features of construction, combination of elements and arrangement of parts which are adapted to effect such steps, all of the exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a flow chart showing the operation of the apparatus for generating a character pattern signal constructed in accordance with the invention;

DETAILED DESCRIPTION OF THE PREFERRED EMBODIMENTS

Figure 5:
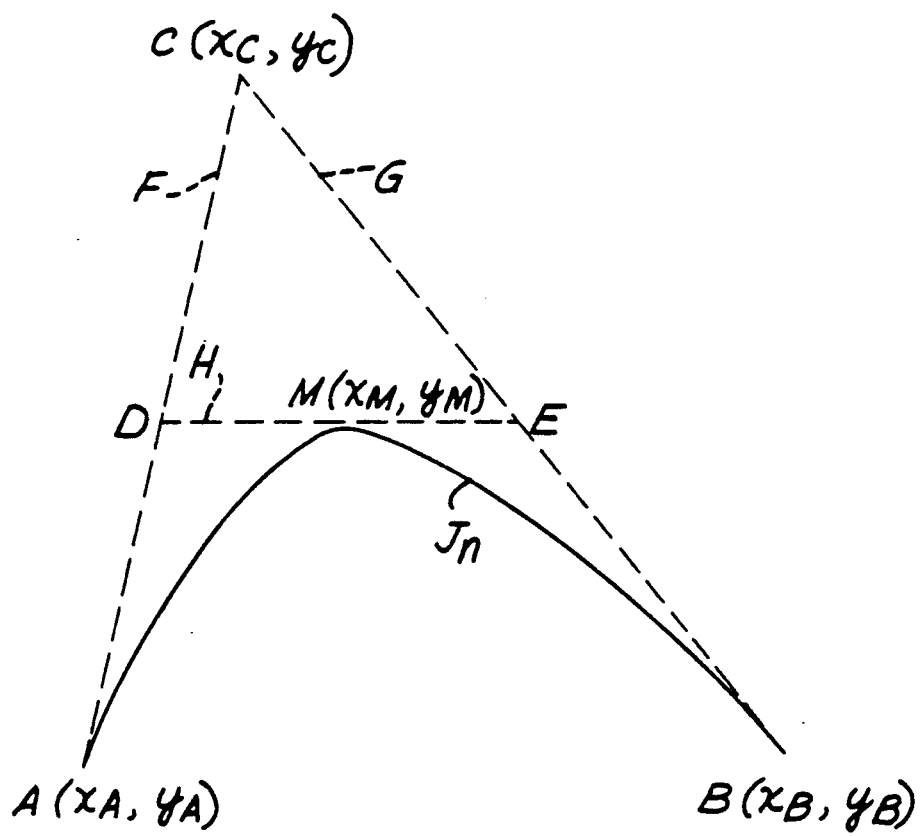
FIG. 5 is a diagram illustrating the conversion of a control point into an auxiliary point in accordance with the invention.
Figure 6:
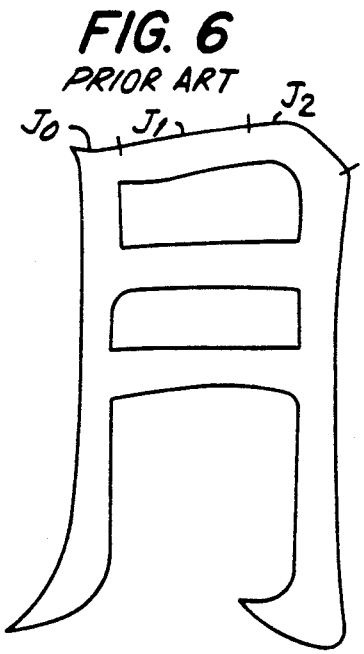
FIG. 6 is a front elevational view of a character having its perimeter divided into regions in accordance with the prior art.
Figure 7A:
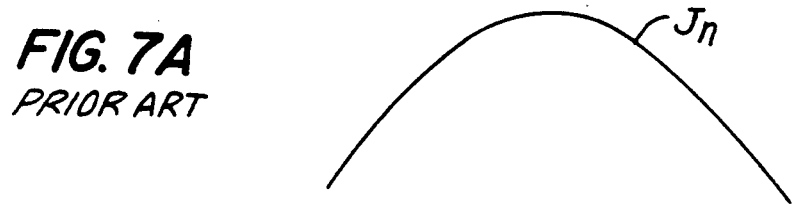
FIGS. 7A, 7B and 7C are illustrations of curves constructed in accordance with the prior art.
Figure 7B:
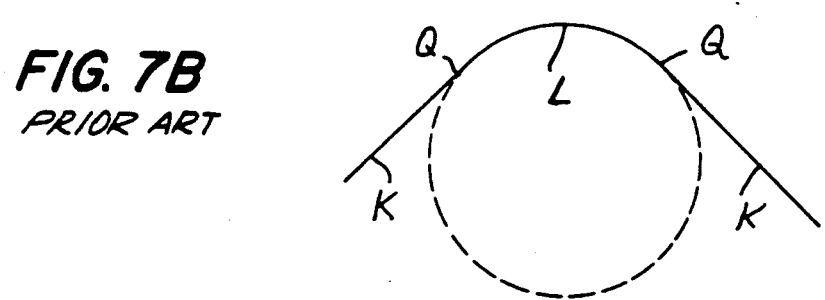
Figure 7C:
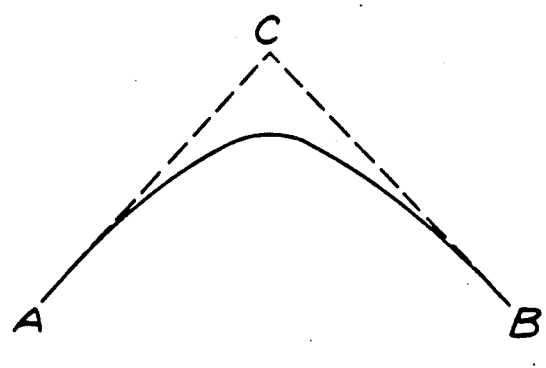

Reference is first made to FIG. 5 wherein a representation of the conversion of a control point to an auxiliary point in accordance with the operation of the invention is presented. A conic spline represented as the curve J approximates the curve $J_2$ (FIG. 6) which is a portion of a character outline. Curve $J_n$ has an initial point A at coordinates $X_A$, $Y_A$ and a terminal point B having a coordinate address $X_B$, $Y_B$. A line F extends tangentially to curve $J_n$ at initial point A. A second line G extends tangentially to curve $J_n$ from terminal point B. A control point C having a coordinate address $X_C$, $Y_C$ is defined at the intersection of lines F and G. A line segment H connecting a midpoint D of line F and a midpoint E of line G is contiguous to conic spline curve $J_n$ at its midpoint M having a coordinate address $X_M$, $Y_M$. Utilizing a parametric function t, an arbitrary point X(t) on conic spline curve $J_n$ maybe expressed as:

$$X(t) = \frac{W_0(1-t)^2 X_A + 2W_1 t(1-t) X_C + W_2 t^2 X_B}{W_0(1-t)^2 + 2W_1 t(1-t) + W_2 t^2}$$

in which $\overline{X}_A$ are the coordinates $(X_A, Y_A)$ of initial point A, $\overline{X}_B$ are the coordinates $(X_B, Y_B)$ of terminal point B, and $\overline{X}_C$ are the coordinates $(X_C, Y_C)$. $\overline{W}_0$, $\overline{W}_1$, $\overline{W}_2$ are co-efficients which determine a curvilinear configuration so that the curvilinear configuration is specified. When $\overline{W}_0 = \overline{W}_1 = \overline{W}_2 = 1$, the above formula may be expressed as follows:

$$X(t) = (1-t^2)X_A + 2t(1-t)X_C + t^2 X_B$$

where $0 \leq t \leq 1$.

From the simplified formula, arbitrary coordinates (X(t), Y(t)) on the curve $J_n$ expressed by the parametric function may now be defined as:

$$X(t) = (1-t^2)X_A + 2t(1-t)X_C + t^2 X_B$$

$$Y(t) = (1-t^2)Y_A + 2t(1-t)Y_C + t^2 Y_B$$

Utilizing initial point coordinates $(X_A, Y_A)$ midpoint coordinates $(X_M, Y_M)$ and terminal point coordinates $(X_B, Y_B)$, the coordinates $(X_C, Y_C)$ of the control point C may be obtained from the following formulas:

$$X_C = \frac{4X_M - X_A - X_B}{2}$$

$$Y_C = \frac{4Y_M - Y_A - Y_B}{2}$$

It follows, that when given the initial point coordinates, midpoint coordinates, and terminal point coordinates of a curve, the control point of the conic spline function can arithmetically be obtained. Therefore, it becomes possible to reproduce the curve based upon the coordinates of the initial point, the midpoint and the terminal point through simple arithmetic processes. When converting the character outline into dot signals, a length 1 of the curve $\stackrel{\frown}{AMB}$ is computed and a partition number N corresponding to the number of units making up curve $J_n$ is obtained from the length of the curve and a size per dot utilized to form the curve. The partition number N is the resolving power of the output unit. If one dot is utilized as the unit quantity of a coordinate scale of the outline data, the length of the curve $\stackrel{\frown}{AMB}$ directly becomes the partition number with respect to a number of one dot variations along the curve.

Figures 1, 2:
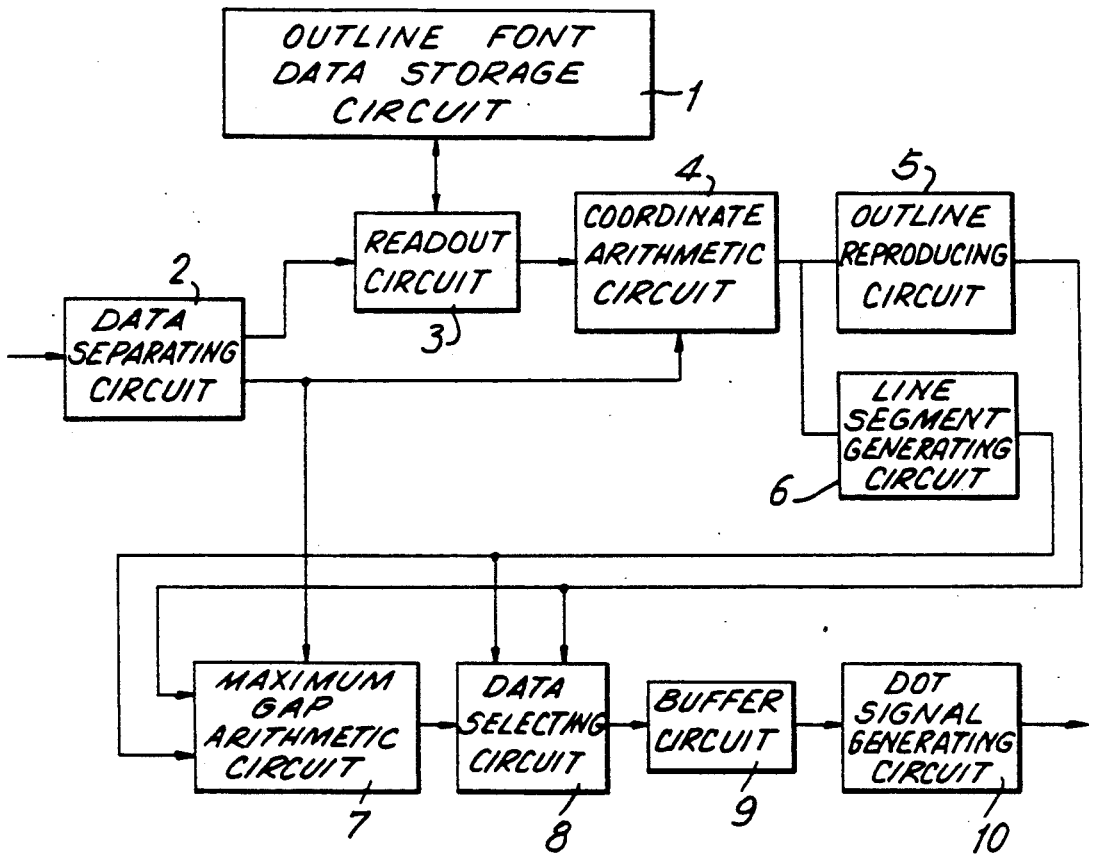
FIG. 1 is a block diagram of an apparatus for generating a character pattern signal constructed in accordance with the present invention.
FIG. 2 is a schematic diagram of a data structure stored in the outline font data storage circuit of the apparatus for generating a character pattern signal of FIG. 1.

Reference is now made to FIG. 1 in which one embodiment of the invention for generating a character pattern signal constructed in accordance with the invention is provided. The apparatus includes an outline font data storage circuit 1. A character code as shown in FIG. 2 is converted into an address and the data needed for a number of individual conic splines corresponding to the respective sub-curves $J_n$ (FIG. 5). The initial point coordinates $(X_{AJ}, Y_{AJ})$, terminal point coordinates $(X_{BJ}, Y_{BJ})$ and auxiliary coordinate $M_J$ for a respective conic spline is stored. If there is a continuous curve, only the coordinates of the terminal point and the auxiliary point need be stored because the terminal point coordinates of the preceding sub-curve serve as the initial point coordinates of the successive sub-curve.

A data separating circuit 2 receives a character code signal received from a host unit along with an attribute signal representing the character size and separates the two signals from each other. The character code signal is output to a readout circuit 3 and the attribute signal is output to a coordinate arithmetic circuit 4.

Coordinate arithmetic circuit 4 converts the coordinates of the initial, terminal and auxiliary points read from storage circuit 1 through read out circuit 3 to coincide with the indicated character size in response to the attribute signal. The coordinate arithmetic circuit 4 outputs the coordinate data stored therein directly to an outline reproducing circuit 5 when the character size to be output is the standard size and outputs the converted coordinates corresponding to the size of the outline to outline reproducing circuit 5 when specifying an output of a character which is larger than the standard size.

The coordinate arithmetic circuit 4 performs arithmetic operations on the initial point coordinates, terminal point coordinates and auxiliary point coordinates when the character size to be output is less than the standard size and outputs these arithmetic results to outline reproducing circuit 5 as well as to a line segment generating circuit 6.

Figure 4A:
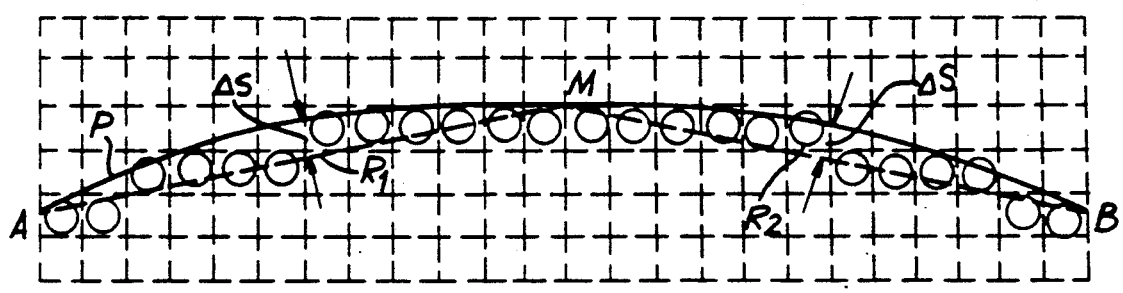
FIGS. 4A, 4B and 4C are diagrams illustrating the operation of the flow chart of FIG. 3.
Figure 4B:
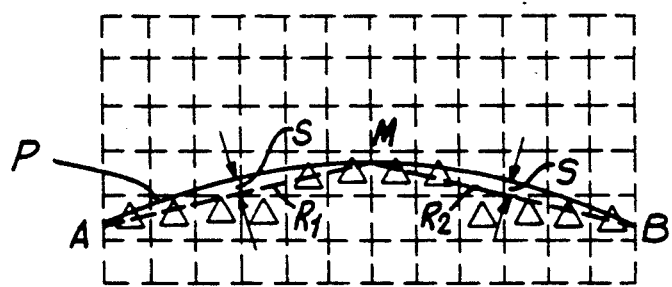
Figure 4C:
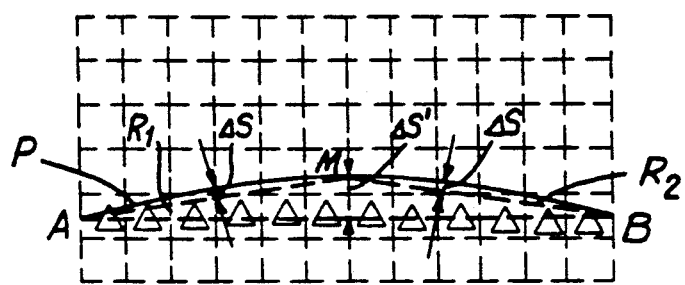

Outline reproducing circuit 5 reproduces the character outline utilizing a reproduction of the conic spline curve based on the input coordinates of the initial point, terminal and auxiliary point received from coordinate arithmetic circuit 4. Line segment generating circuit 6 computes line segment $R_1$ as shown in FIGS. 4A through 4C which connects initial point A to auxiliary point M and a second line segment $R_2$ which connects terminal point B to midpoint M based upon the coordinate data of the initial point A, terminal point B and auxiliary point M. Line segment generating circuit 6 also computes a line segment T connecting initial point A to terminal point B.

The data in outline reproducing circuit 5 corresponds to the actual outline of the character. A maximum gap arithmetic circuit 7 compares the data output by outline reproducing circuit and the data output by line segment generating circuit 6 in response to an attribute signal from data separating circuit 2 which indicates that a character smaller than the standard size is to be printed. Maximum gap arithmetic circuit 7 conducts an arithmetic operation on a maximum gap $\Delta S$ illustrated as the gap between curve P and line segments $R_1$ and $R_2$ (FIGS. 4A–C). The maximum gap $\Delta S$ is compared with a reference value $\Delta D$. For example, $\Delta D$ may be set at one half of the dot diameter. If the maximum gap $\Delta S$ is larger than the reference value, a signal for outputting the conic spline is output to a data selecting circuit 8. However, if the maximum gap $\Delta S$ is less than the reference value, maximum gap arithmetic circuit 7 outputs a signal for selecting line segments $R_1$, $R_2$ corresponding to the line segments connecting the initial point A with auxiliary point M and auxiliary point M to terminal point B or line segment T connecting initial point A to terminal point B as the outline data.

Data selecting circuit 8 outputs the data selected as the outline data to a buffer circuit 9. When the character size specified by the attribute signal is greater than a standard sized character, data selecting circuit 8 outputs the data of outline reproducing circuit 5 to buffer circuit 9. When a smaller sized character is specified, either the signals of the outline reproducing circuit 5 or the line segment generating circuit 6 may be output to buffer circuit 9 in accordance with the input of the maximum gap arithmetic circuit 7 as discussed above. A dot signal generating circuit 10 compensates the outline data stored in buffer circuit 9 with the dot signals with respect to an internal region thereof and outputs the character pattern signal to a printer.

Reference is now made to FIG. 3 in which a flow chart for the operation of the apparatus is provided. A character outline is divided into a plurality of regions which are suited to being approximated utilizing the conic spline function. Initial points A, terminal points B and control points C are established with respect to the individual regions. These control points C are converted into auxiliary points M utilizing the above described methods and equations. Character codes received from the host unit are stored in outline font data storage circuit 1 in the form of addresses as shown in FIG. 2. After the outline data for all of the characters have been stored and once the character signals have been input from the host unit, the character signals are separated into character code signals and attribute signals by data separating circuit 2. It is determined whether the character signal is separated in a step 100. If the character signal has been separated, read out circuit 3 accesses outline font data storage circuit 1 through the outputting of character code signals. The attribute signals are input to the coordinate arithmetic circuit 4 determining the character size in a step 102. Read out circuit 3 initiates read out of the outline data exhibiting a conic spline relative to the respective regions which are combined to shape the outline of the corresponding character in a step 104.

It is determined whether the character to be output is a standard sized character in a step 106. If the character to be output is a standard sized character, coordinate arithmetic circuit 4 outputs the read out outline data directly to outline reproducing circuit 5 which utilizes the data to form the character outline in a step 108. Data selecting circuit 8 selects the output of outline reproducing circuit 5 and inputs that data to buffer circuit 9. It is then determined whether that is the last divided region of the character in step 110. If it is not the last region, the output is reapplied in step 108. If it is the last region, then the output of outline reproducing circuit 5 is converted into dot pattern signals for compensating the outline regions in a step 112 and the dot pattern signals are then output to a printer or the like in a step 114.

If it is determined in step 106, that the attribute signal transmitted from the host unit indicates a character which is not a standard size in step 106, then it is determined whether the signals indicate a character having a larger than standard size in a step 116. If the character is larger than standard size, the coordinate arithmetic circuit 4 converts the coordinates of the initial point A, terminal point B and auxiliary point M which makes up the outline data obtained from read out circuit 3 into coordinates which correspond to a specified rate of enlargement in a step 118. These converted coordinates are then output to outline reproducing circuit 5. Outline reproducing circuit 5 computes a conic spline function consistent with the input coordinates in a step 120 and outputs the function to buffer circuit 5 through data selecting circuit 8. This process is repeated for each divided region of the character to be printed. If all of the regions have been converted, in a step 122, an enlarged outline associated with a single character is thus formed and dot signal generating circuit 10 converts the enlarged outline stored in buffer circuit 9 into dot pattern signals in a step 112. These characters are then output in a step 114.

If it is determined that the character to be output is not larger than a standard size in a step 116, coordinate arithmetic circuit 4 converts the coordinates initial point A, terminal point B and auxiliary point M constituting the outline data produced from read-out circuit 3 into coordinates consistent with a specified rate of shrinkage in a step 124. Thus converted coordinates are output to line segment generating circuit 6 as well as to outline reproducing circuit 5. Outline reproducing circuit 5 performs a coordinate conversion corresponding to the rate of shrinkage on the conic spline in accordance with the input coordinates of the initial point A, terminal B and auxiliary point M in a step 126. At the same time, line segment generating circuit 6 computes line segments $R_1$, $R_2$ which respectively connect initial point A and terminal point B to auxiliary point M in step 128.

Maximum gap arithmetic circuit 7 computes a maximum gap Δ S determined between line segment $R_1$ and $R_2$ and the conic spline in step 130. It is then determined whether the maximum gap is greater than a standard number in step 132. If the maximum gap Δ S is greater than the standard number, the conic spline outline data is output in a step 134. It is then determined whether each of the regions has been determined in a step 146. If each of the regions has been determined indicating a completed character, conversion is then performed in a step 112 and the character is output in a step 114.

If maximum gap Δ S between a rising portion of the conic spline and one of the line segments $R_1$, $R_2$ is smaller than the reference value as illustrated in FIG. 4B in step 132, a line segment T connecting initial point A to terminal point B is computed in a step 136. A maximum gap Δ S' between a rising portion of the conic spline and line segment T is also computed in a step 138. If the maximum gap Δ S' is greater than a reference value, such as when the curvature of the conic spline curve P is large (FIG. 4B), as determined in a step 140, line segments $R_1$ and $R_2$ are selected as the character outline in a step 142 and output to buffer circuit 9. If Δ S' is smaller than the reference value, such as when the curvature of the conic spline is small (FIG. 4B), line segment T connecting initial point A to terminal point B is selected in a step 144 and output to buffer circuit 9. If it is determined that the entire outline has been operated upon a step 146, dot signal generating circuit 10 converts line segments $R_1$ and $R_2$ or line segment T into dot data in a step 112. The converted character is then output in step 114.

When converting the outline into dot signals, the outline corresponding to that portion in which maximum gap Δ S is less than the reference value is approximated by straight lines. Therefore, sufficient arithmetic operations of a linear function are performed in a shorter arithmetic time when generating the dot than is required when operating a conic spline. It therefore becomes possible to reduce the time required to generate a character in accordance with a dot pattern. Even if a region in which the maximum gap is smaller than the reference value is approximated by the straight line, since dot sizes of a display or a printer for printing an outline font are predetermined depending upon the type of machines, there is no probability of it exerting influence on a character quality.

The above embodiment is illustrated by way of example with Chinese characters. However, the apparatus is equally applicable to alphabets, numerals, Korean characters and the like. Additionally, the apparatus and method may be utilized with graphs, symbols, marks and all sorts of geometric shapes such as a triangle, rectangle, circle and the like.

The character pattern generating apparatus is incorporated into a display unit or is attached as an auxiliary unit thereto. Read-out circuit 2 operated in accordance with an outline display may be formed on a display unit such as a CRT and a liquid crystal panel. Therefore, it is feasible to construct a variety of display units on large sized computers, personal computers, work stations and electronic calculators or the like utilizing this apparatus and method.

The character pattern generating apparatus may also be incorporated into a printer or attached as an auxiliary unit thereto. Read-out circuit 3 is thereby operated in accordance with an outline of print command. With this arrangement, the printing operation can be performed by a wire dot type printer, ink jet type printer, a thermal printer, a laser printer or the like. It is thus possible to constitute a variety of printers for use with large sized computers, personal computers, work stations and electronic calculators or the like utilizing this apparatus and method.

As discussed above, conic line data is utilized to define the curve utilizing an arrangement so that both ends of each region are defined as the initial and terminal points and a control point is provided outwardly of this curve. This is accomplished by dividing the outline of a character into a plurality of such defined regions. An outline data storage circuit converts the control point into an auxiliary point having coordinates at one point on the curve and stores the initial point, terminal point and auxiliary point as data. A coordinate arithmetic circuit receives an attribute signal and reads out the data from the outline font data storage circuit through a read out signal and forms converted coordinates in response thereto. An outline reproducing circuit receives the converted coordinates and produces an outline in response thereto. A selecting circuit in response to the attribute signal indicating a decreased sized character computes both a linear function for connecting the initial, terminal and auxiliary points to each other and a maximum gap between the curve passing through the initial point, terminal point and auxiliary point and the line segment and outputting the conic line data when the maximum gap is greater than a reference value and the linear function as outline data when the maximum gap is smaller than the reference value. The outline of the outline reproducing circuit is produced at all other times. By providing such a construction, it is possible to reproduce the conic spline utilizing an auxiliary point for standard sized characters or enlarged characters. The outline data is provided utilizing the line segments for scaled down characters so that the generating velocity of dot patterns is increased by omitting unnecessary arithmetic processes. Additionally, the arithmetic processes are executed on the line data with an accuracy limited only by the dot size and is determined dependent upon the output device, thereby speeding up the generation of the dot patterns without causing any decline in character quality.

It will thus be seen that the objects set forth above, among those made apparent from the preceding description are efficiently attained and since, certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. An apparatus for generating a character pattern signal corresponding to a character in response to a character code signal and an attribute signal, the character having an outline which may be divided into at least two regions, each region being defined by conic data defining a curve including an initial point and terminal point defining a beginning and end of the region and a control point positioned outside the curve comprising:

a converting means for converting the control point into an auxiliary point having coordinates at one point on the curve; an outline storage means for storing the initial point, terminal point and auxiliary point as data;

outline reproducing means for converting the data into scaled down data, standard sized data or enlarged data in response to the attribute signal; and reproducing a conic spline from the stored data;

selecting means for computing, in response to an attribute signal indicating scaled down data, a linear function for producing a first line segment for connecting the initial point to the auxiliary point, a second line segment for connecting the terminal point to the auxiliary point and a third line segment for connecting the terminal point to the initial point, and computing a maximum gap between a curve passing through the initial point, terminal point and auxiliary point and the first line segment and second line segment and outputting the conic spline when the maximum gap is greater than a reference value and either both the first line segment and second line segment, or the third line segment, as outline data when the maximum gap is smaller than the reference value; and a dot pattern data converting means for outputting dot signals on the basis of the outline data.

2. The apparatus of claim 1, wherein the outline data reproducing means includes data separating means for separating the character code signal from the attribute signal;

readout means for reading the data from said outline data storage means; and coordinate arithmetic means for converting the readout data to the enlarged data, a standard sized data and scaled down data in response to the attribute signal, said outline data reproducing means outputting one of the enlarged outline, standard size outline or smaller outline as the outline data.

3. The apparatus of claim 1, wherein the selecting means includes a line segment generating means which generates the first line segment, second line segment and third line segment in response to the outline reproducing means converting data into scaled down data;

maximum gap arithmetic means for computing the maximum gap; and data selecting means for receiving the output of the outline reproducing means and the line segment generating means, and outputting the output of the outline reproducing means if the attribute signal indicates an enlarged character is to be output, a standard size character is to be output or a scaled down character is to be output if the maximum gap is greater than the reference value and outputting the first line segment and second line segment as the outline of the character if the maximum gap is less than a reference value and computing a second maximum gap if the first maximum gap is less than the reference value and outputting the third line segment as the outline of the character if the second maximum gap is less than a second reference value.

4. A method for generating a character pattern signal corresponding to a character in response to a character code signal, the character having an outline which may be divided into at least two regions, each region being defined by conic data defining a curve including an initial point and a terminal point defining a beginning and end of the region, and a control point outside of the curve comprising the steps of:

converting the control point of a conic spline forming the region into an auxiliary point on said conic spline;

determining whether the character is to be output as an enlarged sized character, a standard sized character, or a decreased size character, converting the terminal point, auxiliary point and initial point to scaled down data if the character to be produced is a decreased sized character, converting the terminal point, initial point and auxiliary point to enlarged data if the character to be produced is an enlarged sized character;

reproducing the conic spline by utilizing the auxiliary point if the character is to remain in a standard size, reproducing the conic spline utilizing the enlarged data if the character is to be enlarged;

computing a linear function for computing a first line segment for connecting the initial point to the auxiliary point, computing a second line segment for connecting the terminal point to the auxiliary point and computing a third line segment for connecting the terminal point to the initial point if the character to be output is to be a decreased sized character;

computing a maximum gap between said conic spline passing through the scaled down initial point, terminal point and auxiliary point and the first line segment and second line segment;

outputting said conic spline utilizing said scaled down data as outline data when the maximum gap is greater than a reference value; and outputting either both the first line segment and second line segment, or the third line segment, as outline data when said maximum gap is smaller than the reference value.

* * * * *